Jan. 1, 1929. E. S. BALLARD Re. 17,179

PRINTING FORM AND METHOD OF PRODUCING SAME

Original Filed March 19, 1926

Inventor
Ernest S. Ballard

By Chas. A. Shurtleff
his Attorney

Reissued Jan. 1, 1929.

Re. 17,179

UNITED STATES PATENT OFFICE.

ERNEST S. BALLARD, OF OAKLAND, CALIFORNIA, ASSIGNOR TO BALLARD PROCESS CO., A COPARTNERSHIP COMPOSED OF RUSSELL B. LEECH, OF SAN FRANCISCO, AND COLVIN M. REED, OF BURLINGAME, AND SAN FRANCISCO, CALIFORNIA.

PRINTING FORM AND METHOD OF PRODUCING SAME.

Original application filed March 19, 1926, Serial No. 96,020. Renewed December 8, 1926. Original No. 1,643,046, dated September 20, 1927. Application for reissue filed May 5, 1928. Serial No. 275,943.

This invention relates to improvements in printing forms or surfaces for use in photogravure, rotary photogravure and like processes and to a novel method of producing such forms or surfaces.

Some of the printing forms heretofore proposed for use in the above mentioned processes have embodied a base on which there was deposited an exterior layer of metal adapted to receive the image to be reproduced in some instances, and, after the required reproductions had been made, such exterior layer would be removed by subjecting the form to an acid which would remove said layer. In other instances, the previous etching on the outer surface is removed by grinding, a process which is slow and costly and also reduces the cross section of the form.

Removal of the outer etched surface by acid is costly, wasteful and uneven in results. Removal by grinding is slow and costly. For these reasons, the primary object contemplated by the present invention consists in providing a novel printing form for photogravure or rotary photogravure processes, as well as a novel method of preparing such a form, the salient characteristic of the form being that the exterior layer, on which is received the engraved image to be printed, may be speedily removed from the permanent base without the use of acids or by slow and costly grinding.

The improved process herein disclosed for the production of printing forms provides a means of depositing by electrolysis upon a metallic base, preferably cylindrical in form, a layer of metal, preferably copper, in such a manner that the layer or coating, though surrounding the base and remaining in close contact therewith by reason of its own cylindrical and all-embracing form, can at any time be stripped from the base by peeling or tearing therefrom, beginning at the circumferential ends of the base. The process also provides, in order to further guard against the removal of the outer layer of metal until such removal is desired, a seal or lock for a narrow margin along the two circumferential ends of the cylinder, said seal consisting of an actual mechanical union between the outer layer and the base, effected by electrolytic action.

Referring to the figures of the drawing.

Figure 1:
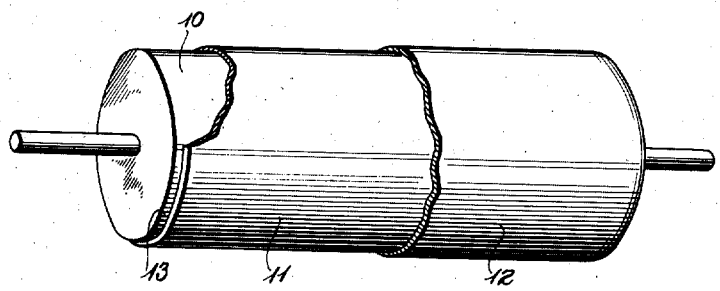
Figure 1 is a perspective view of a printing roll showing the use of my invention.
Figure 2:
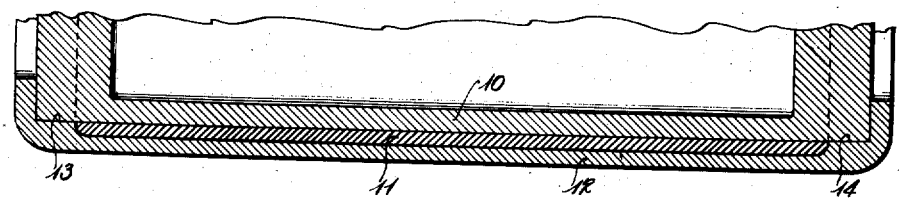
Figure 2 is an enlarged fragmentary sectional view thereof.

While the printing form may assume any desired shape, in so far as the practice of the present invention is concerned, the form shown in the present instance comprises a permanent base in the form of a cylinder 10, preferably with a brass or copper surface, which may be provided with a suitable means for mounting it in the apparatus in which it is to be used. Applied to said base 10 is a thin layer or coating of material 11 of relatively low fusibility, preferably an alloy of tin, lead, cadmium and bismuth or other alloy of low fusibility, which is applied to base 10 by raising the temperature of base 10 to a higher degree than the melting point of the alloy, and then applying the same, using suitable fluxes, and wiping the alloy over the entire useful surface of base 10, polishing off to a uniform mirror finish. Other suitable means common in soldering practices can be utilized to apply and uniformly distribute the coating of alloy.

On the very thin layer 11 there is applied an exterior coating 12 of some metal adapted to receive the images to be printed. In actual practice it is preferred to form said layer 12 of copper, the base 10 of copper or brass, and the intermediate layer of an alloy of lead, tin, bismuth and cadmium, or other alloy, in such proportions as will give an alloy melting point of about 202 degrees Fahrenheit.

With the base 10 coated with this alloy of lead, tin, cadmium and bismuth, or other alloy, but with narrow margins at each end, 13 and 14, exposed and presenting a portion of the base not covered with the alloy, the form is immersed in a plating solution composed of copper sulphate, water and sulphuric acid in approximate proportions of two pounds of copper sulphate and one half pound of sulphuric acid to one gallon of water, and kept in rapid uniform rotation, while subjected to a current of electricity passing from a sheet of copper placed nearby in the solution and known as the anode, the revolving cylinder being the cathode and being electrically connected with the source of current supply, the whole being the arrangement commonly used in the electro-deposition of copper.

Under such treatment, with brisk uniform rotation of the cylinder, the very thin layer or coating 11 on the cylinder takes on a smooth and even coating of copper to any required thickness, but in practice plated only to a thickness sufficient to receive the engraved image. A slight buffing or polishing will quickly render the surface 12 suitable for printing purposes such as before mentioned.

Although electro-deposited upon the coating 11, the layer 12 is not mechanically or otherwise attached thereto, it being a peculiar and requisite characteristic of the alloy surface, that the thin layer of electro-deposited copper 12, by reason of the electro-chemical reactions with the alloy during the electroplating as formerly noted, does not adhere to the surface of the alloy 11. The alloy at all times provides a uniform conducting basic surface favoring the uniform distribution of a copper deposit from the moment the electro-deposition begins. While this isolation of the copper surface might be accomplished between itself and any base by the interposition of a coating of grease, graphite, lacquer, or similar composition, such isolating results in extremely uneven plating, so that the final electro-deposited surface is not in condition to receive an etched image, without the customary and usual grinding and surfacing treatment.

The only mechanical connection established by the electrolytic action is at margins 13 and 14, where the copper conveyed from the anode has firmly attached itself to the uncovered copper or brass surfaces of these margins, acting as an air tight seal and lock for the cylinder of copper that has been deposited upon the coating 11. Thus the layer 12, in intimate but not mechanical connection with layer 11, is further kept in close contact therewith by atmospheric pressure.

This lack of actual mechanical adhesion follows from the fact that coating 11, consisting of an alloy of low melting point, preferably lead, tin, bismuth and cadmium, or other metal, upon being placed in the electroplating solution as heretofore mentioned and described, is affected electro-chemically by the plating solution preventing the copper, conveyed to coating 11 by electrolytic action, from entering into mechanical or actual connection or adhesion with the alloy, although establishing a certain degree of union that maintains layer 12 in close and intimate contact with coat 11. The electrically deposited coat 12, being cylindrical in form and sealed at each end by the actual mechanical and airtight contacts at 13 and 14 becomes for all practical purposes an integral part of the printing form, and after slight polishing and buffing is ready to receive the engraved image.

After the form thus made has had the desired impression or image placed thereon and has been used, if it is desired to remove such impression and substitute another, the seal at the ends 13 and 14 is broken by filing the circumferential edge or by using other abrasive means when it will be found that layer 12 superimposed upon coat 11 is not adhering thereto, and by starting with a knife edge or otherwise can be readily peeled off leaving coat 11 ready to receive another electrodeposited layer 12, if coat 11 is undamaged. Otherwise coat 11 is restored to proper condition by flowing on new metal as in common soldering practices, or as heretofore described, after which the process may be repeated.

By being thus able to easily and speedily remove the impression carrying layer 12, the present invention eliminates the grinding down of the copper or other base and the consequent reduction in size of the form.

It will be appreciated that if the outer surface of the base 10 is highly polished and if coat 11 is evenly applied thereupon, and likewise polished to a uniform mirror-like surface, it will follow that layer 12, preferably of copper, will go on smoothly, and only a comparatively thin layer will be required for a printing surface. Thus the electrical energy and time required in other processes for heavily coating the form with copper and in subsequent turning and grinding back to uniform shape and size is rendered unnecessary.

While I have herein specifically described and illustrated the preferred method of carrying out my invention, it will of course be understood that the same is capable of various modifications within the scope of the appended claims without departing from the spirit thereof. For example, while I preferably employ the said metallic coating 11 in the manner herein described and illustrated, it will be obvious that the employment of means other than this specific coating for preventing adherence of the layer 12 is within the scope of my invention.

Non-adhesion between the major portion of the outer layer and cylinder may be effected in numerous ways. Grease, oil, graphite or tarnishing and oxidizing re-agents may be spread over the surface of the metallic base, thereby preventing the adhesion of the copper of the outer layer in electro-plating said copper upon the base. By keeping the marginal circumferences from such oil, grease, graphite or tarnishing and oxidizing re-agents, sealing at the margins can be established as heretofore described, and at the same time provide for non-adherence over the major area of the supporting surfaces.

What I claim is:

1. The method of producing cylindrical printing forms for use in photogravure and like processes, consisting of providing a permanent metallic cylindrical base having a smooth or polished outer layer of a material characterized by the fact that the metal used thereon for printing will not permanently unite therewith, and providing a coating of hard metal of a depth sufficient to receive the engraved image on said outer layer by electrodepositing said metal thereon, the coating of hard metal being adapted to be readily removed from the base after use without substantially affecting said outer layer.

2. The method of producing printing forms or surfaces for use in photogravure and like processes, consisting of providing on a permanent base a layer of material with which the metal used thereon for printnig will not permanently unite, and providing a thin coating of the required metal on the said layer base by electrodepositing the said metal thereon, the coating being adapted to be readily stripped from the base after use.

3. The method of producing printing forms or surfaces for use in photogravure and like processes, consisting of providing on the greater portion of a permanent base a layer of material with which the metal used thereon for printing will not permanently unite, and providing a thin coating of the required metal on the said layer base by electrodepositing the said metal thereon, the said metal and base uniting to form a seal at the portions not covered by the said layer, and the coating being adapted to be readily stripped from the base after use by breaking this seal.

4. The method of producing cylindrical printing forms or surfaces for use in photogravure and like processes, consisting of providing on the greater portion of the cylindrical surface between the marginal edges thereof a layer of material with which the metal used thereon for printing will not permanently unite, and providing a thin coating of required metal on the said layer base by electro-depositing action, the coating being freely removable from the cylinder except at the marginal portions where the metal unites with the base to form a seal.

5. The method of producing printing forms or surfaces for use in photogravure and like processes which consists in applying to a permanent base a layer of material of low fusibility which may be distributed evenly over said permanent base and polished to a mirror smoothness conforming to the surface of the base itself, and coating said layer with a metallic coating on which the image to be printed may be received.

6. The method of producing printing surfaces for use in photogravure and like processes which consists in applying to a permanent base a layer of metal of low melting point, and applying to said layer by electrodeposition, a layer of copper upon which the image to be printed may be received.

7. The method of producing successive printing surfaces for use in photogravure and like processes which consists in applying to a permanent base a layer of metal of low fusibility and electro-depositing a layer of copper thereon, said layer of copper adhering to the coating of low fusibility without having a mechanical connection therewith, whereby the copper layer may at any time be stripped therefrom.

8. A cylindrical printing form for use in photogravure and like processes, consisting of a permanent metallic base having an outer layer finished to a mirror-like surface and characterized by the fact that it is susceptible to electrochemical action solely to the extent of permitting the adherence between said layer and the metal used for printing, and an exterior layer of hard metal electrodeposited thereon to a depth sufficient to receive only a single engraved image whereby said exterior layer may be removed from said mirror-like surface without substantially affecting the latter.

9. A printing form for use in photogravure, rotary photogravure and like processes consisting of a permanent base, and a multiplicity of layers of metal on same, the exterior layer being electrodeposited thereon, and adapted to receive the image to be engraved thereon, the connection between said exterior layer and the next adjacent layer being such that said exterior layer is capable of being bodily removed from said form by merely stripping away.

10. A printing form for use in photogravure and like processes consisting of a permanent base, a thin layer of metal of low relative fusibility on said base, and an exterior layer electrodeposited thereon but not adhering to the inner layer of metal of low fusibility, but adhering and entering into mechanical union with the base on its margin where there is no covering of metal of low fusibility said layer on the exterior of said metal of low fusibility being removable by cutting or breaking those portions where adhesion exists between the exterior layer and the base and thereafter stripping away the remaining portions which have not adhered to the metal of low fusibility.

11. A printing form for use in photogravure and like processes consisting of a permanent base, a thin layer of metal of low fusibility on said base, and an exterior layer of metal electrodeposited thereon, said exterior layer having a mechanical connection or union with said base and substantially free of the layer of metal of low fusibility whereby said exterior layer may be removed from the layer of metal of low fusibility without affecting the latter.

12. A printing form for use in photogravure and like processes consisting of a permanent base, a thin layer of metal of low fusibility on said base and an exterior layer covering said base and said metal of low fusibility, there being a mechanical connection between said base and exterior layer only for retaining said layer on the form.

13. The method of producing printing surfaces for use in photogravure and like processes which consists in applying to a permanent base a coating of an alloy of tin, lead, cadmium and bismuth, and applying to said coating by electrodeposition a layer of copper upon which an image to be printed may be received.

14. A printing form for use in photogravure and like processes, consisting of a permanent cylindrical metallic base finished accurately to a definite diameter and provided with a surface layer having an outer mirror-like surface, said layer being formed of material characterized by the fact that it is susceptible to electrochemical action solely to the extent of permitting the adherence between said layer and the metal used for printing, and an exterior layer of hard metal electro-deposited thereon to a depth sufficient only for receiving a single etching and in a manner to provide a smooth outer surface approximating the smoothness of said base, said exterior layer being removable from said mirror-like surface without substantially affecting the latter.

15. An intaglio printing form comprising a metallic base, a thin layer of metal applied to said base and finished accurately to a definite diameter and provided with an outer polished mirror-like surface, said layer being formed of a material characterized by the fact that it will unite with but not permanently adhere to copper when the latter is electrolytically deposited thereon, and a thin exterior layer of copper electro-deposited on said first named layer to a depth sufficient only for receiving a single etching and in such manner as to provide an exterior layer having a smooth printing surface approximating the smoothness of said first named layer, whereby said exterior layer may be readily removed without substantially affecting the mirror-like surface on said first named layer.

In testimony whereof I affix my signature.

ERNEST S. BALLARD.